UNITED STATES PATENT OFFICE.

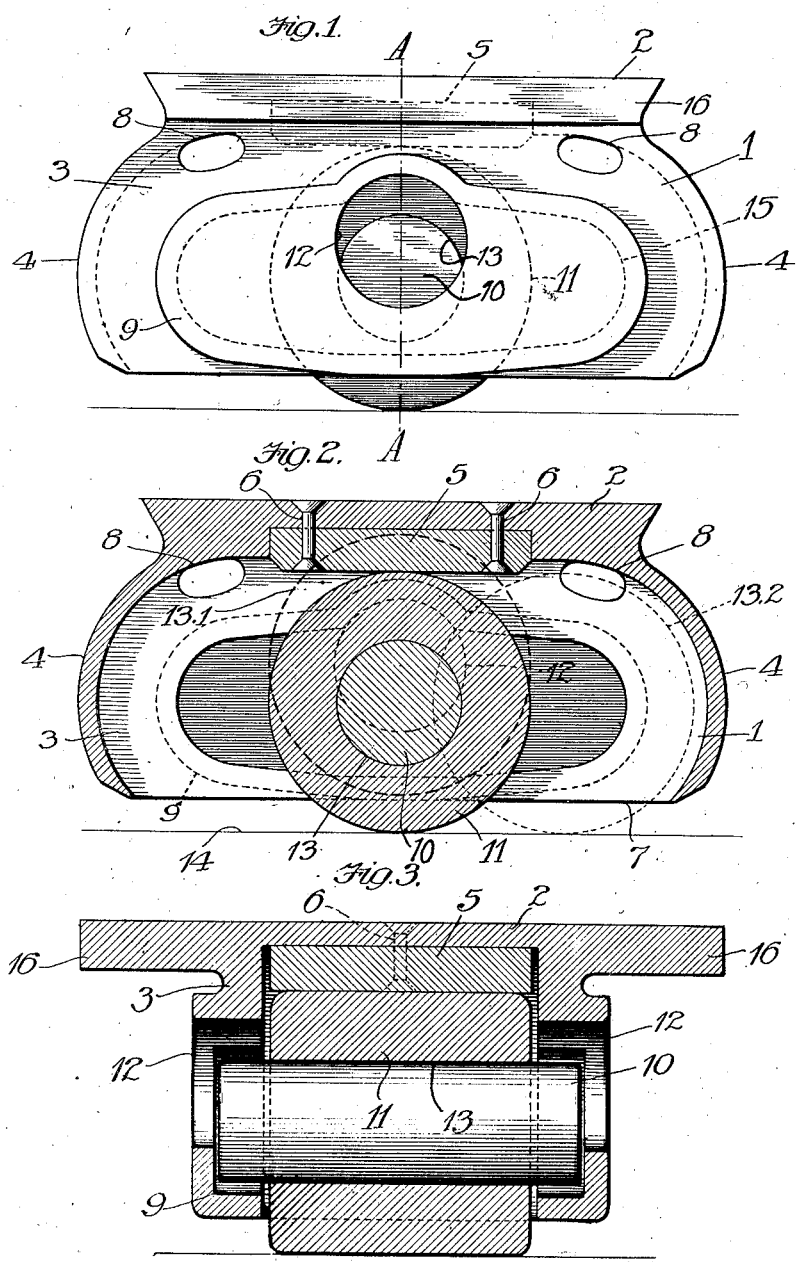

ELMYR A. LAUGHLIN, OF CHICAGO, ILLINOIS.

SIDE BEARING.

1,112,013.  Specification of Letters Patent.  Patented Sept. 29, 1914.

Application filed May 22, 1913. Serial No. 769,269.

*To all whom it may concern:*

Be it known that I, ELMYR A. LAUGHLIN, a citizen of the United States of America, and a resident of Chicago, county of Cook, and State of Illinois, have invented certain new and useful Improvements in Side Bearings, of which the following is a specification.

This invention relates to side bearings for railway cars.

The main objects of the invention are to provide an improved and simplified side bearing suitable for use on either the car or the truck bolster, and to provide a housing designed so as to admit of passing a wear plate through the roller opening and securing it to the housing after a roller is in place in the housing in such manner as to prevent removal of the roller.

An illustrative embodiment of this invention is shown in the accompanying drawings in which—

Figure 1 is a side elevation of the side bearing as it would appear when secured to the bolster of a car body. Fig. 2 is a longitudinal sectional view of the bearing. Fig. 3 is a transverse vertical section taken on the line A—A of Fig. 1.

It is desirable to so construct side bearings for railway cars that the bearings may be shipped as complete units and not be liable to have parts of the bearings become disengaged therefrom either before or during service. To accomplish this end it has been customary to make the housing of the bearings in separable parts so that said parts may be secured together after the wearing plates and rollers have been assembled with the housing and thus retain said wearing plates and rollers within the housing. In the present case the roller of each bearing is provided with a removable shaft or trunnions and the housing of the side bearing is provided with an opening through which said shaft or trunnions may be inserted to be fitted within the roller. The side bearing is also designed to receive a wearing plate after the roller has thus been assembled with the housing, said wearing plate serving to prevent the shaft from again coming into alinement with the opening in the housing.

Referring to the drawings, a housing 1 is shown having a solid top 2, side walls 3, and end walls 4. The bearing is secured to the bolster of the car body or the bolster of the truck by bolts passing through the flanges 16. Seated in a depression in the part 2 of the housing is a wear plate 5 which may be riveted to the part 2 by rivets 6 as indicated in Figs. 2 and 3. Substantially the entire bottom of housing 4 is open, as designated by the numeral 7. Dirt escape holes 8 are also provided in the housing 1 and are serviceable particularly when the housing is secured to the car truck instead of to the car body.

The side walls 3 of the housing are so formed as to provide runways 9 for the ends of a shaft 10 passing through a roller 11. The shaft 10 is separable from the roller 11 and the side walls 3 are provided with circular openings 12 through which the shaft may be passed when it is assembled with roller 11, but in order to bring the opening 13 of the roller which receives shaft 10 in alinement with the openings 12 of the housing 1, it is necessary that this be done before the wear plate 5 is secured to housing 1, as when the wear plate is in position it prevents the roller 11 from being alined with the openings 12. After the shaft 10 has been fitted within the roller 11 the roller is pushed to one side as indicated by the dotted lines 13.2. This leaves plenty of room for inserting the wear plate 5 through the opening 7 in the housing 1 and riveting it to the part 2 of the housing. It may be seen that while one rivet is being set it is necessary to have the roller 13 at one side of the housing, and to set the other rivet it is necessary to move the roller to the opposite side of the housing. It may be seen from the drawings that after the wear plate is secured to the housing it is impossible, without first removing the wear plate, to remove the shaft 10 from roller 11 as the wear plate prevents the roller from being moved back to the position indicated by the dotted lines 13.1 where its shaft may be in alinement with the openings 12.

The operation of the device is similar to that described in applicant's copending application Serial No. 756,491, filed March 24, 1913, but briefly it may be said that cars are usually supported on their trucks by a center bearing but rocked from side to side with respect to the trucks, and thereby require side bearings to limit this rocking movement, and also when the cars are rounding curves one or the other of the side bearings assists in supporting the car. When one of the side bearings thus assists in supporting the car at the time of rounding curves, the roller 11 rolls between the wear plate 5 and a suitable wearing surface 14 on the truck. If the car turns so far that the ends of shaft 10 arrive at the reduced ends 15 of the runways, the weight borne by the bearings will be transmitted from the housing 1 to shaft 10, whereas normally the weight is transmitted direct from the upper wear plate 5 to the roller. When the load is thus transferred from the wear plate 5 to the shaft 10, the roller may continue to rotate after reaching the end of the runway and the resistance to such rotation will be less than the tractive resistance between the roller and the lower wear plate. The side of the car is lifted slightly because of the form of the runways, and thus through its weight urges the truck to return to its normal position for running on a straight track. When the weight of the car is again borne by the center bearing, the rollers 11 are free to roll back to their central positions.

Although but one specific embodiment of this invention has been herein shown and described, it will be understood that numerous details of the construction shown may be altered or omitted without departing from the spirit of this invention as defined by the following claim.

I claim:—

In a side bearing for railway cars, the combination of a roller, a housing having an opening through which said roller protrudes, and having ways at opposite sides thereof, a wear plate in said housing cooperating with said roller, said roller having a removable shaft extending into said ways, a retaining wall at the outer side of each way, and said ways being greater in height at their centers than the diameter of said shaft and being suitably reduced in height at their ends whereby the load normally transmitted through said wear plate may be transmitted through said shaft when the roller is at the ends of said ways, one of said retaining walls having therein an opening for the passage of said shaft and said wear plate being adapted to be inserted through said roller opening and adapted when in place to prevent said shaft from registering with said shaft opening.

Signed at Chicago this 20th day of May 1913.

ELMYR A. LAUGHLIN.

Witnesses:
EUGENE A. RUMMLER,
JENNIE BURT.